US010618717B2

(12) United States Patent
Kneisel et al.

(10) Patent No.: US 10,618,717 B2
(45) Date of Patent: Apr. 14, 2020

(54) CRYOGENIC STORAGE BOX

(71) Applicant: Argos Technology, Inc., Vernon Hills, IL (US)

(72) Inventors: Philip A. Kneisel, West Dundee, IL (US); Walter Raczynski, Arlington Heights, IL (US); Peter T. Hadjis, Vernon Hills, IL (US)

(73) Assignee: Argos Technology, Inc., Vernon Hills, IL (US)

( * ) Notice: Subject to any disclaimer, the term of this patent is extended or adjusted under 35 U.S.C. 154(b) by 0 days.

(21) Appl. No.: 15/665,390

(22) Filed: Jul. 31, 2017

(65) Prior Publication Data

US 2019/0031421 A1 Jan. 31, 2019

(51) Int. Cl.
| B65D 81/18 | (2006.01) |
| B65D 25/10 | (2006.01) |
| B65D 43/16 | (2006.01) |
| B65D 43/22 | (2006.01) |
| B65D 47/32 | (2006.01) |
| B01L 9/06 | (2006.01) |
| A01N 1/02 | (2006.01) |
| F25D 11/00 | (2006.01) |
| B01L 7/00 | (2006.01) |

(52) U.S. Cl.
CPC ........... B65D 81/18 (2013.01); A01N 1/0263 (2013.01); B01L 9/06 (2013.01); B65D 25/108 (2013.01); B65D 43/164 (2013.01); B65D 43/22 (2013.01); B65D 47/32 (2013.01); B01L 7/50 (2013.01); B01L 2300/043 (2013.01); B01L 2300/048 (2013.01); B01L 2300/0809 (2013.01); F25D 11/003 (2013.01)

(58) Field of Classification Search
CPC ...... B65D 81/18; B65D 43/22; B65D 43/164; B65D 25/108; B65D 47/32; B01L 9/06; B01L 2300/0809; B01L 2300/043

USPC ........ 220/810–848, 283, 263, 244, 500–557; 206/828, 528

See application file for complete search history.

(56) References Cited

U.S. PATENT DOCUMENTS

| 3,682,597 A | 8/1972 | Husch |
| 3,743,088 A * | 7/1973 | Henkin ..................... A61B 5/00 206/569 |
| D264,810 S | 6/1982 | Voltmann |
| D271,239 S | 11/1983 | Lemieux et al. |

(Continued)

FOREIGN PATENT DOCUMENTS

WO 2015078767 A1 6/2015

OTHER PUBLICATIONS

ISR for PCT/US2018/044314, dated Oct. 22, 2018.

*Primary Examiner* — Kareen K Thomas

(74) *Attorney, Agent, or Firm* — Fishman Stewart PLLC

(57) ABSTRACT

An apparatus having a cryogenic storage box able to withstand temperatures down to at least negative (−)180 degrees Celsius. The cryogenic storage box includes a lid member coupled to a base member via a hinge. The lid member includes slots and magnets held therein via pressure. The base member also includes slots having magnets held therein via pressure, as well as vial supports configured to support vials in an upright position. When the lid member is in a closed position, each lid magnetic aligns with a base magnet along a respective vertical axis to magnetically couple the lid member to the base member.

13 Claims, 8 Drawing Sheets

(56) References Cited

U.S. PATENT DOCUMENTS

| | | | |
|---|---|---|---|
| 4,434,890 A * | 3/1984 | Sieck | B65D 5/5038 |
| | | | 206/443 |
| D280,015 S | 8/1985 | Sarajian | |
| D282,577 S | 2/1986 | Neumeister | |
| 5,057,282 A * | 10/1991 | Linder | B01L 9/543 |
| | | | 206/366 |
| D324,819 S | 3/1992 | Eisenberg | |
| D330,670 S | 11/1992 | Georgakis et al. | |
| 6,015,064 A * | 1/2000 | Liu | A45C 13/02 |
| | | | 206/372 |
| 6,019,225 A | 2/2000 | Kalmakis et al. | |
| 6,875,405 B1 | 4/2005 | Mathus et al. | |
| D529,622 S | 10/2006 | Hadjis et al. | |
| 2007/0193909 A1 | 8/2007 | Chin et al. | |
| 2014/0171829 A1 * | 6/2014 | Holmes | A61B 5/150305 |
| | | | 600/575 |
| 2016/0067707 A1 * | 3/2016 | Lu | C12Q 1/6876 |
| | | | 506/33 |
| 2016/0332165 A1 | 11/2016 | Gunther | |

\* cited by examiner

CRYOGENIC STORAGE BOX

BACKGROUND

Cryogenic storage boxes may be employed to store specimen or sample vials in cold storage, where temperatures can dip down to −180 degrees Celsius or lower.

Often, cryogenic boxes include a polymer base configured to hold vials and a polymer hinged-lid that clasps to the base when in a closed position. Mating portions of the clasps are often integrated onto the outer surface of the lid and base of the storage boxes. As such, the clasps are often comprised of the same polymer material that make up the base and lid.

The lid, clasped to the base, provides a layer of protection to the vials and to whatever may be stored in the vials. For example, the clasped lid may prevent the cryogenic box from inadvertently opening when the box is lifted by the lid without supporting the base. Such a clasping mechanism, however, can be problematic. As mentioned above, these boxes are often stored at very low temperatures. As such, the cold temperatures can make the clasping mechanism of such cryogenic boxes brittle and/or difficult to operate. In addition, since many cryogenic storage boxes are often placed in storage (e.g., placed next to each other on metal freezer racks that are placed in a cold storage unit), the clasping mechanism on the outside of each box can cause the box to take up extra space in the storage unit or cause a storage rack not to fit in a storage unit.

Thus, there is a need for cryogenic storage boxes that circumvent such problems.

DETAILED DESCRIPTION

Figure 1A:
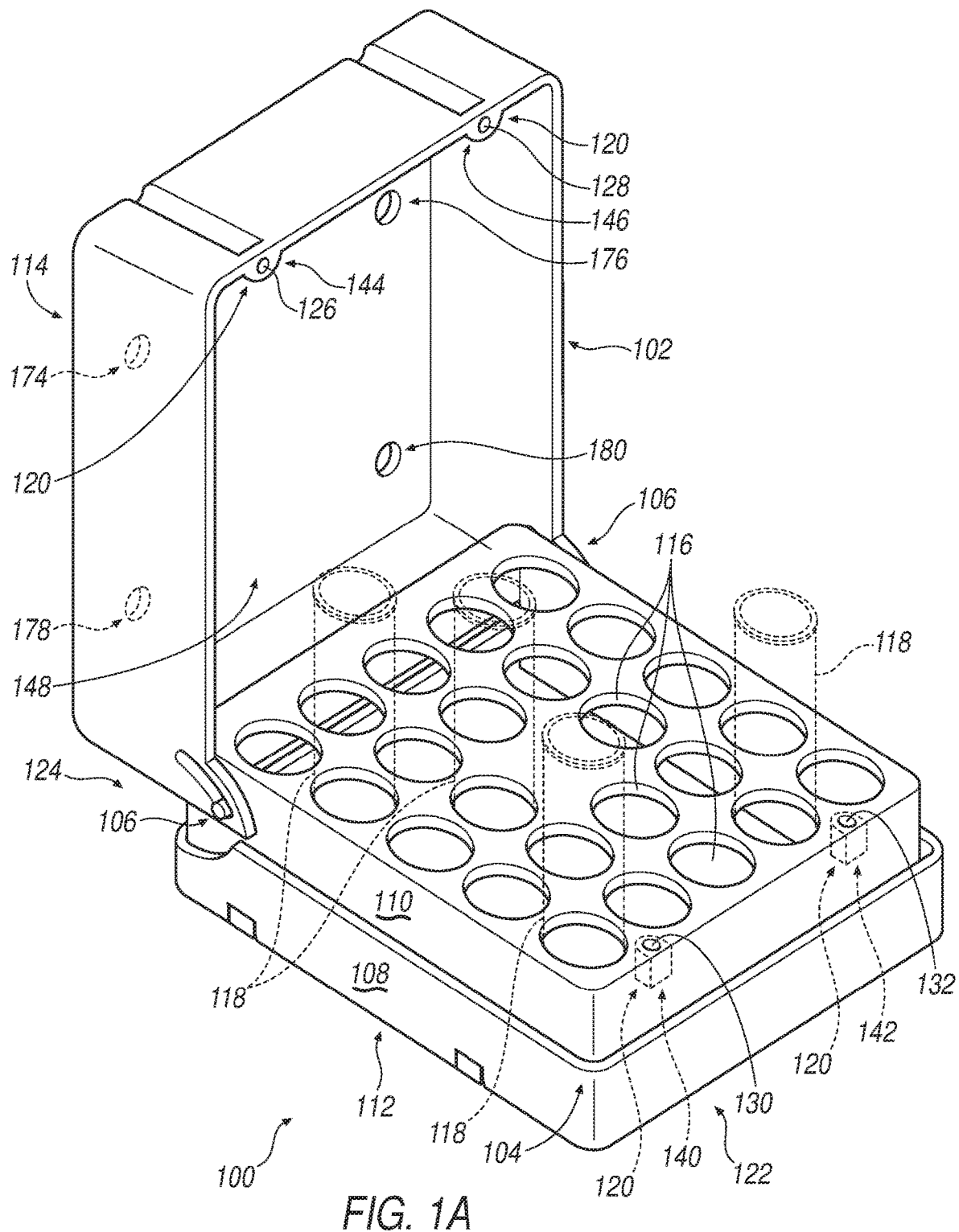
FIG. 1A illustrates an exemplary cryogenic storage box that is opened.
Figure 1B:
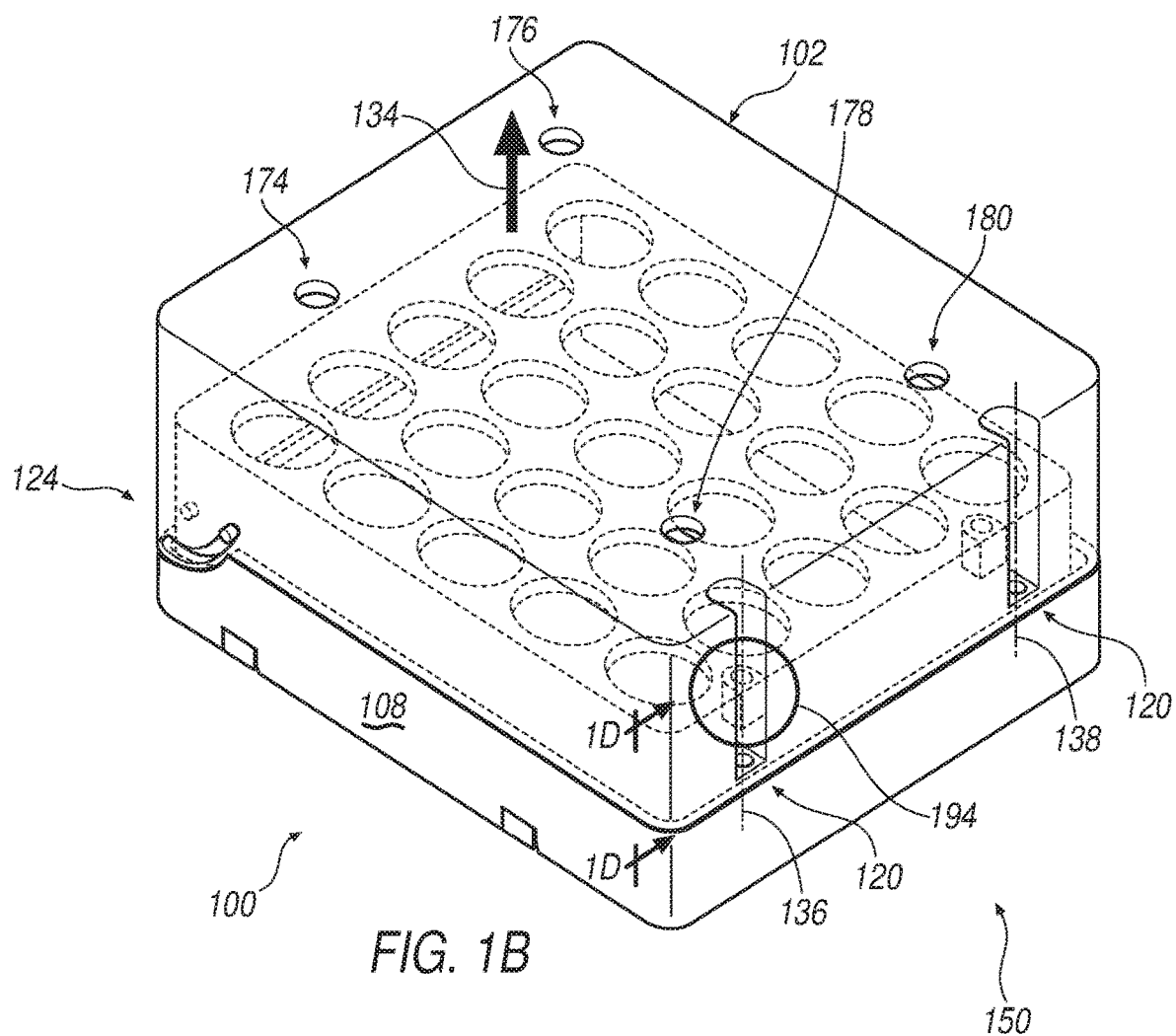
FIG. 1B illustrates the exemplary cryogenic storage box of 1A that is closed.

FIGS. 1A and 1B illustrate an exemplary cryogenic storage box 100, where the cryogenic storage box 100 is shown opened in FIG. 1A and closed in FIG. 1B.

With reference to both FIGS. 1A and 1B, the cryogenic storage box 100 includes a lid member 102 coupled to a base member 104 via a hinge-like mechanism 106 that allows the cryogenic storage box 100 to be opened (FIG. 1A) and closed (FIG. 1B). It is contemplated that a variety of hinge-like mechanisms can be employed.

The base member 104 includes a lower unit 108 coupled to an upper unit 110. According to the illustrative example depicted in FIGS. 1A and 1B, a bottom surface 112 of the lower unit 108 is not parallel to a top surface 114 of the upper unit 110. Alternate illustrative approaches (not shown) may have the bottom surface 112 parallel to the top surface 114, or at an angle different than that shown in FIGS. 1A and 1B.

Though the example shown in FIGS. 1A and 1B depicts the lower unit 108 and the upper unit as two distinct parts of the base member 104, it is contemplated that the base member 104 may be comprised of a single piece (not shown) that forms the base member 104.

The lid member 102 and the base member 104 are composed of a material(s) (e.g., a polycarbonate) that is relatively stable through a wide range of temperatures (e.g., −180° C. to 122° C.).

According to the illustrative approach shown in FIGS. 1A and 1B, the upper portion or unit 110 of the base member 104 includes a plurality of apertures 116. The plurality of apertures or openings 116 is configured to support a plurality of vials 118, ampoules or the like (shown in phantom) placed therein. Though only four vials 118 are shown in phantom, the example illustrated includes twenty-five apertures 116 (i.e., vial supports), each capable of supporting a vial. Other approaches (not shown in FIGS. 1A and 1B), however, may include more or less than twenty-five apertures 116 to support more or less than twenty-five vials, space and vial size being among the factors to be considered when determining the appropriate number of apertures.

It is noted that, since the top surface 114 of the upper unit 110 is angled (i.e., not parallel to the bottom surface 112 of the lower unit 108), it is easier for a user (not shown) to remove and replace vials into the base member 104.

The cryogenic storage box 100 also includes a magnetic coupling mechanism 120 generally located at a side 122 opposite a hinge side 124 of the cryogenic storage box 100. Where a hinge-like mechanism is employed (e.g., hinge-like mechanism 106 of FIG. 1) with a magnetic coupling mechanism (e.g., magnetic coupling mechanism 120), together they form a closing mechanism. That is, the hinge-like mechanism 106 and the magnetic coupling mechanism 120 aid in keeping the lid member 102 in a closed position. Other illustrations (not shown) may employ a closing mechanism without a hinge. That is, the closing mechanism may only employ a magnetic coupling system comprised of one or more magnets. Nonetheless, the magnetic coupling mechanism 120 is configured to help keep the cryogenic storage box 100 in the closed position as illustrated in FIG. 1B. The magnetic coupling mechanism 120 includes a first lid magnet 126, a second lid magnet 128, a first base magnet 130, and a second base magnet 132. Effectively, the magnets 126-132 create a magnetic latch, where opposing magnets brought into alignment are oriented such that the attractive force created by the magnetic field surrounding each magnet is multiplied as the open free ends of each magnet approach one another. Further detail is provided below with respect to FIG. 1D. While FIGS. 1A and 1B illustrate four magnets 126-132 employed to create the coupling mechanism 120, other illustrative approaches (not shown) may include one or more than two magnets to create the magnetic coupling mechanism 120. For example, a magnet may engage an iron based material located lacking the properties of a magnetic in place of an opposing magnet. A key goal under many circumstances, however, is to maximize the number of vials. Using opposing magnets to create the coupling mechanism 120 has been found to minimize the space required to maintain box 100 in a closed position for safe handling without inadvertent opening of the box. For example, two magnets engaging each other take up less space than one larger magnet engaging an opposing iron based material lacking such properties to provide the same magnetic closing force. Since the coupling mechanism 120 is magnetic, and not a polymer clasping or latching mechanism, the potential for the polymer clasps or latches to crack or fail because of the low storage temperatures is avoided.

The strength of the magnetic coupling system 120 is such that the cryogenic storage box 100, when in the closed position (see FIG. 1B), may be lifted by the lid member 102 by an upward force 134 without the lid member 102 opening or separating from the base member 104. In other words, the closed cryogenic storage box 100 (FIG. 1B) may be lifted by the lid member 102 and still remain in the closed position, even when completely or partially filled with vials (e.g., plurality of vials 118).

As shown in FIG. 1B, while the cryogenic storage box 100 is in a closed position, the first lid magnet 126 aligns with the first base magnet 130 along a first vertical axis 136. Also, while the cryogenic storage box 100 is in the closed position, the second lid magnet 128 aligns with the second base magnet 132 along the second vertical axis 138 to magnetically couple the lid member 102 to the base member 104. That is, first lid magnetic 126 aligns with the first base magnet 130 along the first vertical axis 136 and the second lid magnet 128 aligns with the second base magnet 132 along the second vertical axis 138 to magnetically couple the lid member 102 to the base member 104 while in the closed position (see, e.g., FIG. 2B). As discussed above, since the coupling mechanism 120 is a magnetic coupling mechanism, rather than a clasp or other similar latching mechanism, the cryogenic storage box 100 can be opened (see FIG. 1A) or closed (see FIG. 1B) at low temperatures with reduced risk of cracking the cryogenic storage box 100 or its coupling mechanism 120.

According to the illustration depicted in FIGS. 1A and 1B, the first and second base magnets 130, 132 are respectively positioned in a first base slot 140 and a second base slot 142 of the magnetic coupling mechanism 120. Slots 140 and 142 are spaced at a location remote from the hinge-like mechanism 106. It is contemplated that the first and second base magnets 130, 132 are respectively affixed to the first and second base slots 140, 142 via pressure, and without an adhesive. That is, the tolerances are such that the first and second base magnets 130, 132 exert a pressure on the respective first and second base slots 140, 142 and vice versa. As such, a friction-fit couples the base magnets 130, 132 respectively into the base slots 140, 142. Accordingly, no adhesives are employed to affix the first and second base magnets 130, 132 respectively into the first and second base slots 140, 142. Since adhesives (not shown) can fail in low temperature environments or in environments that are subjected to a wide range of temperatures, such as the environments often found in cryogenic storage, care should be taken if an adhesive is employed.

Further, since the lid member 102 and the base member 104 are composed of a material(s) (e.g., polycarbonate) that is stable through a wide range of temperatures (e.g., −180° C. to 122° C.), the coupling mechanism 120 is unlikely to misalign or malfunction due to expansion and contraction when subjected to a wide range of temperatures.

Referring back to FIGS. 1A and 1B, the first and second lid magnets 126, 128 are respectively positioned in a first lid slot 144 and a second lid slot 146. It is contemplated that these first and second lid magnets 126, 128 are affixed to the respective first and second lid slots 144, 146 via pressure, and without an adhesive. That is, the tolerances between each lid magnet 126, 128 and each lid slot 144, 146 are such that the lid magnets 126, 128 respectively exert a pressure on each lid slot 144, 146, and vice versa. Due to this pressure or friction-fit, no adhesives are employed to affix the first and second lid magnets 126, 128 respectively into the first and second lid slots 144, 146.

In order to minimize the size of the cryogenic storage box 100, the slots 140-146 are placed inside 148 the cryogenic storage box 100, rather than outside 150 the cryogenic storage box 100. It is also noted that the slots 140-146, and accompanying magnets 126-132, are positioned so as not to overlap any aperture of the plurality of apertures 116 when the cryogenic storage box 100 is closed (see FIG. 1B). Further, the slots 140-146 and magnets 126-132 are positioned so as not to interfere with the vials (e.g., plurality of vials 118) when the lid member 102 is opened and closed. As such, the magnetic coupling mechanism 120 does not reduce the number of vials (see the plurality of vials 118) that can be stored in the cryogenic storage box 100. In addition, since the magnetic coupling mechanism 120 is positioned on the inside 148 of the cryogenic storage box 100, other cryogenic storage boxes (not shown) can abut each other, thus maximizing storage space when multiple boxes are place in a cryogenic storage unit (not shown).

Further details regarding the slots 140-146 and magnets 126-132 of the magnetic coupling mechanism 120 will be set forth below with respect to FIG. 1D.

Figure 1C:
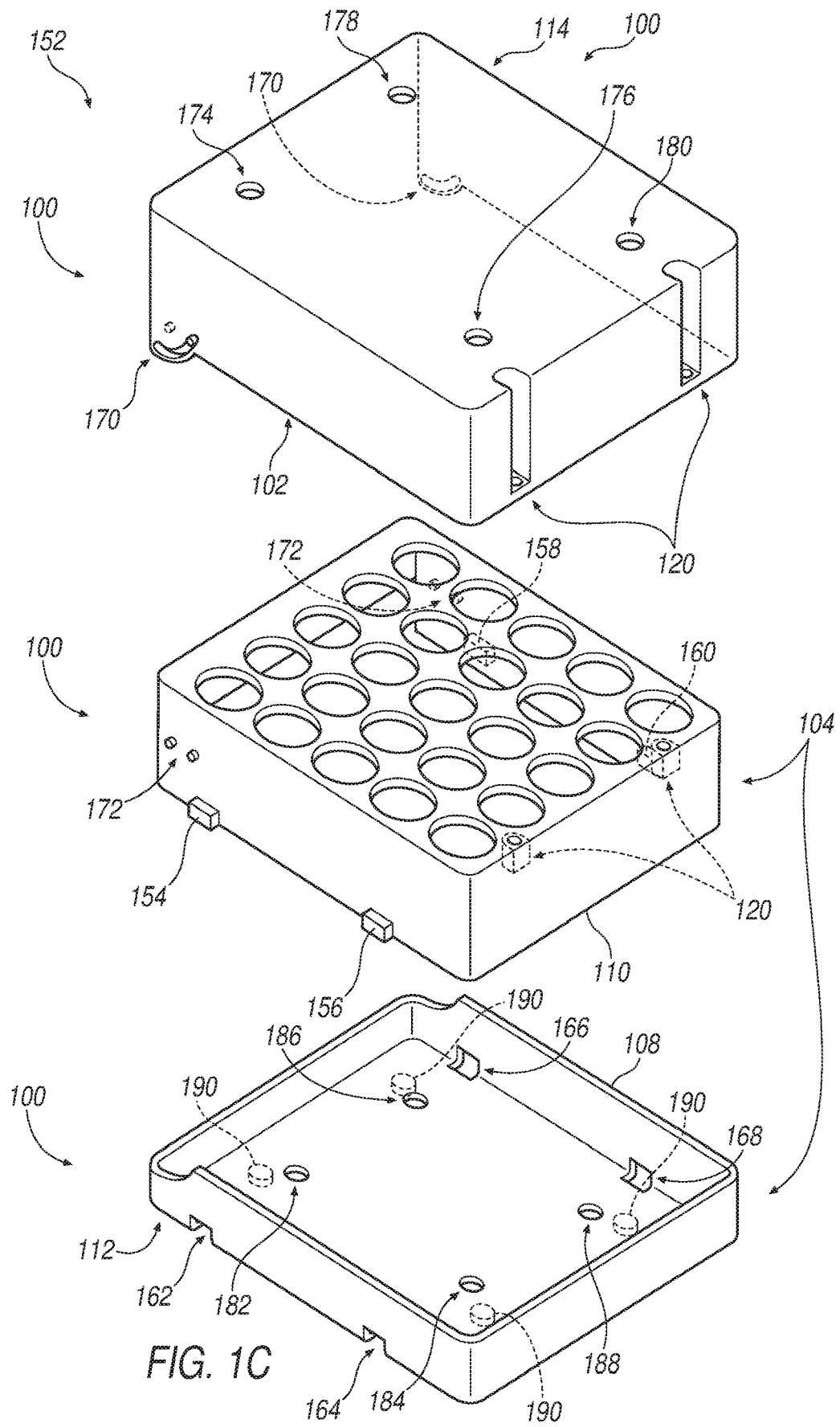
FIG. 1C illustrates an exploded view of the exemplary cryogenic storage box of FIGS. 1A and 1B.

Referring now to FIG. 1C, a perspective of the cryogenic storage box 100 of FIGS. 1A and 1B is shown in an exploded view 152. As depicted, the cryogenic storage box 100 is comprised of the lid member 102 and the base member 104, where the base member 104 includes the upper unit 110 and the lower unit 108. When assembled, a first clip 154, a second clip 156, a third clip 158, and a fourth clip 160 of the upper unit 110 respectively couple to the lower unit 108 unit at a first opening 162, a second opening 164, third opening 166, and a fourth opening 168, thus forming the base member 104. Moreover, the clips and openings may be flip-flopped between the two units even if used. Other techniques (not shown) for coupling the upper unit 110 to the lower unit 108 that do not employ the clips 154-160 and openings 162-168 may be employed so long as they are applicable to the extreme temperature range to which the cryogenic storage box 100 is subjected.

The hinge-like mechanism 106 of cryogenic storage box 100 includes a first portion 170 integrated into the lid member 102 and a second portion 172 integrated into the base member 104.

The lid member 102 includes various (four being illustrated) vent and/or drainage holes (i.e., openings) 174, 176, 178, 180 and the base member 104 also includes various (again four being illustrated) openings 182, 184, 186, 188. These openings 174-188 can serve as drainage ports and/or ventilation ports for the cryogenic storage box 100. For example, any fluids (not shown) that accumulate in the lower unit 108 of the base member 104 may drain out of openings 182-188. In addition, for example, the openings 174-188 may allow for air circulation in and out of the cryogenic storage box 100 as well as for the escape of any gas (not shown) that may outgas from materials (not shown) in the vials (e.g., the plurality of vials 118).

It is contemplated that the cryogenic storage box 100 may also include a plurality of protrusions or offsets 190 extending downward from the bottom surface 112 of the lower unit 108. Further details regarding offsets will be set forth below with respect to FIGS. 2A and 2B.

Figure 1D:
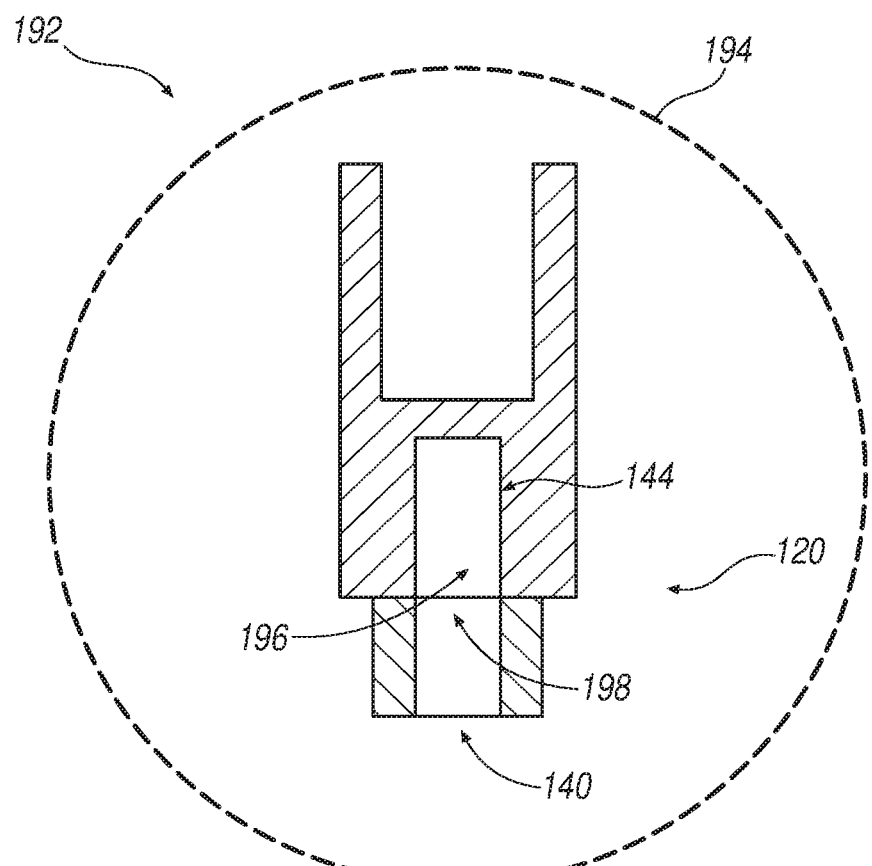
FIG. 1D is a cross-sectional view of a portion of a magnetic coupling system of the cryogenic storage box of FIGS. 1A-1C.

With reference now to FIG. 1D, a cross-sectional view 192 of a region 194 along D-D of FIG. 1 B is shown, according to an illustrative approach. The first lid magnet 126 is friction-fitted into the first lid slot 144 and the first base magnet 130 is friction-fitted into the first base slot 140. Further, the first lid magnet 126 is oriented such that a south pole 196 of the first lid magnet 126 is adjacent to a north pole 198 of the first base magnet 130 when in the closed position. It is noted that the orientation of the magnets 126, 130 may differ from that shown in FIG. 1D, as long as adjacent magnet pairs (e.g., magnet pair 126 and 130) are oriented such that opposite magnetic polarities (e.g., N to S, or S to N) are adjacent to one another. Though not shown in FIG. 1D, the remaining magnets 128, 132 (see FIG. 1A) can be oriented in the same manner set forth in this paragraph.

The strength of the magnets 126-132 are such that the cryogenic storage box 100, when in the closed position (see, e.g., FIG. 1B), can be lifted by the lid member 102 and remain in the closed position, even if the cryogenic storage box 100 is full of vials (e.g., ampoules, standard vials, or the like).

Though not shown, it is contemplated that instead of employing four magnets (e.g., magnets 126-132), two magnets and two ferromagnetic materials could instead be employed to create the magnetic coupling mechanism 120. For example, with reference to FIG. 1D, the first lid slot 144 could have the magnet 126 friction-fitted therein, while the first base slot 140 could have a ferromagnetic material friction-fitted therein, or vice versa, instead of the first base magnet 130 as shown in FIG. 1D. In such an instance, the strength of the magnet 126 could be increased so that the cryogenic storage box may be lifted by the lid member and remain in the closed position. Likewise, the remaining magnet pairs (e.g., magnets 128, 132), if any, could instead be a combination of a magnet and a ferromagnetic material.

Figure 2A:
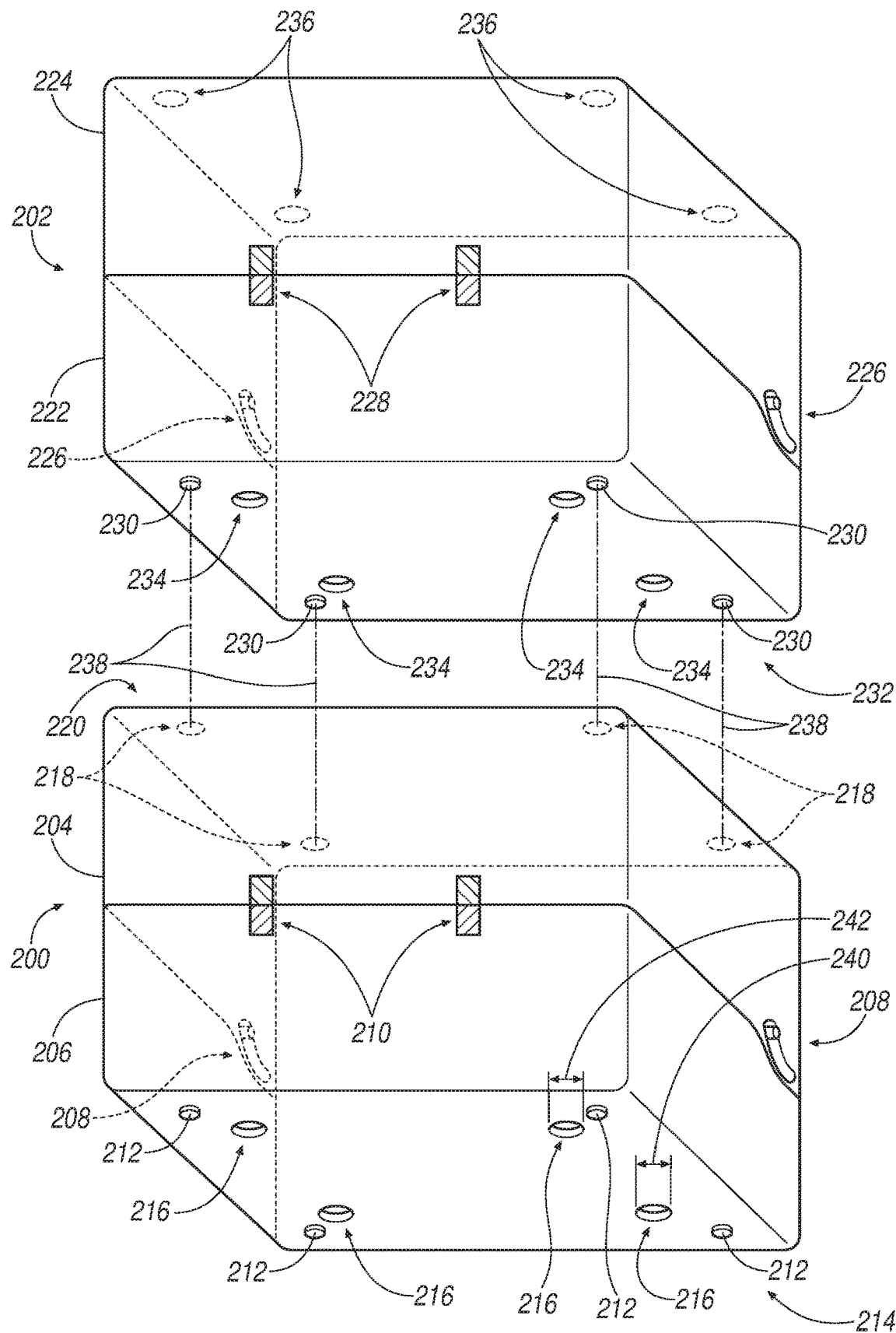
FIG. 2A is a perspective view of two exemplary cryogenic storage boxes.

With reference now to FIG. 2A, a first cryogenic storage box 200 and a second cryogenic storage box 202 are shown according to another example. For purposes of clarity, vial supports (e.g., the plurality of apertures 116 of FIG. 1A) are not shown.

The first cryogenic storage box 200 includes a lid member 204, a base member 206, a hinge mechanism 208, and a magnetic coupling system 210 that can be employed to keep the cryogenic storage box 200 in a closed configuration. A plurality of offsets 212 protrude from a bottom surface 214 of the base member 206 of the first cryogenic storage box 200. The bottom surface 214 of the base member 206 also includes a plurality of base openings 216 therethrough. In addition to the base openings 216, there are a plurality of lid openings 218 through the lid member 204 (i.e., through a top surface 220 of the first cryogenic storage box 200). Together, these openings 216, 218 allow for the passage of air or other gases therethrough, while the base openings 216 may also allow for liquid to drain from the base member 206.

As will be described with respect to FIG. 2B below, the offsets or protrusions 212 can serve as "feet" to offset the bottom surface 214 of the first cryogenic storage box 200 from a work surface (not shown) on which it can be placed. Accordingly, since the bottom surface is offset from the work surface, the plurality of openings 216 can allow liquids to drain from the base member 104 and/or allow air or other gasses to flow therethrough without being impeded by the work surface.

The second cryogenic storage box 202 of FIG. 2A also includes a base member 222, a lid member 224, a hinge mechanism 226, and magnetic coupling system 228 that may be employed to keep the second cryogenic storage box 202 in a closed configuration. The base member 222 includes a plurality of offsets 230 protruding from a bottom surface 232 of the base member 222. In addition, the base member 222 includes a plurality of base openings 234 therethrough and the lid member 224 also includes a plurality of lid openings 236 therethrough. As with the openings 216, 218 through the first cryogenic storage box 200, the openings 234, 236 of the second cryogenic storage box 202 also allow for the passage of gases (e.g., air) therethrough. Further, the plurality of base openings 216 also allow liquids to drain therethrough.

As with the plurality of offsets 212 of the first cryogenic storage box 200, the plurality of offsets 230 of the second cryogenic storage box 202 can be employed to offset the bottom surface 112 from a work surface (not shown). Further, when the second cryogenic storage box 202 is positioned properly on top of the first cryogenic storage box 200 (as will be shown in FIG. 2B), the offsets 230 of the second cryogenic storage box 202 align 238 with the plurality of lid openings 218 of the first cryogenic storage box 200. It is contemplated that a diameter 240 of each offset 230 of the second cryogenic storage box 202 is slightly less than a diameter 242 of each opening 216, 218, 234, 236 through the lid and base members 204, 206 of the cryogenic storage boxes 200, 202. Accordingly, and as will be discussed below with respect to FIG. 2B, when the second cryogenic storage box 202 is placed or stacked upon the first cryogenic storage box 200, these offsets 230 rest inside the openings 218 of the lid member 204 of the first cryogenic storage box 200 to provide stability to the stacked pair 202, 200.

Figure 2B:
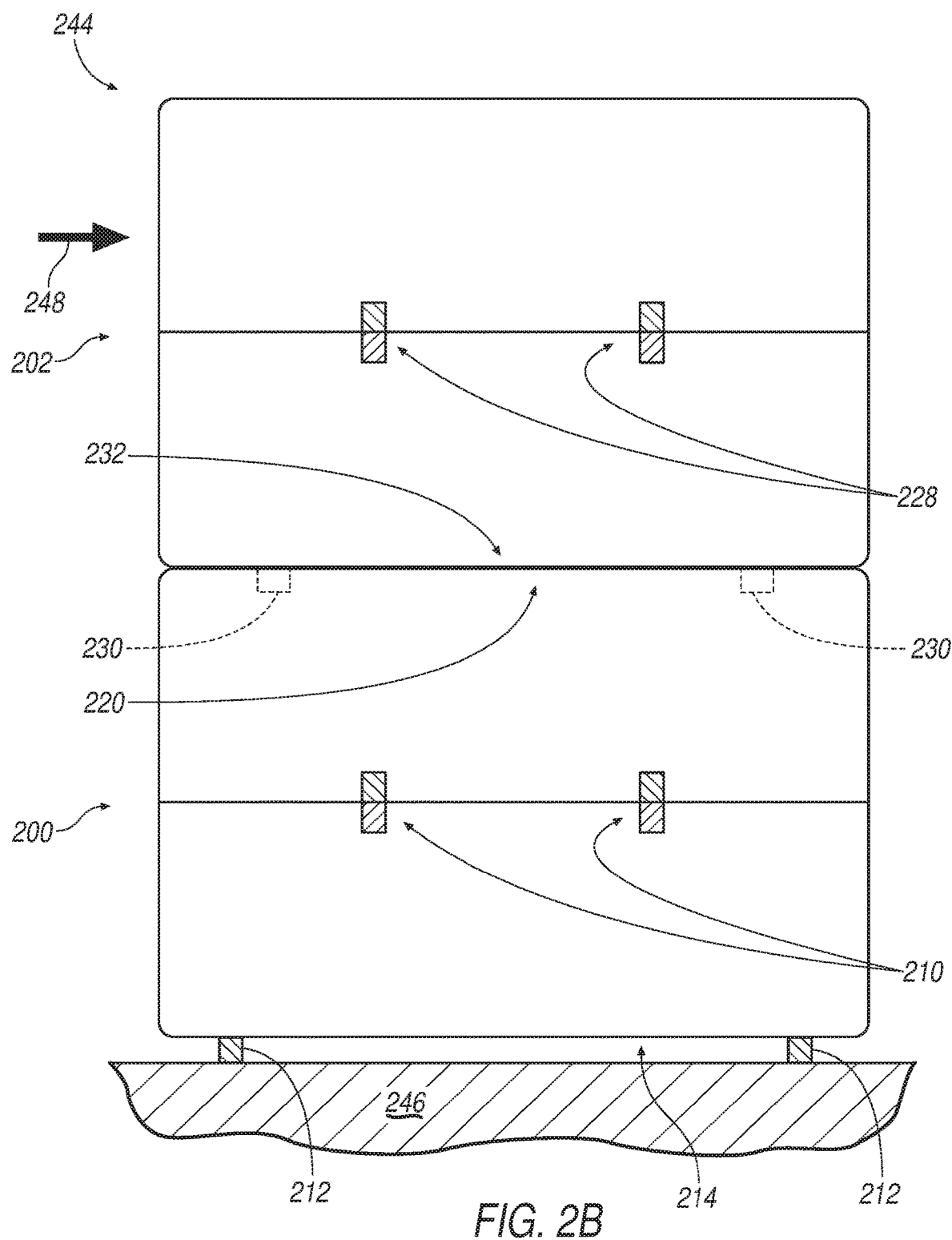
FIG. 2B is a frontal view of the two exemplary cryogenic storage boxes of FIG. 2A stacked upon each other.

With reference now to FIG. 2B, a frontal view 244 of the first and second cryogenic storage boxes 200, 202 of FIG. 2A stacked upon a work surface 246 is shown, according to an example. As illustrated in FIG. 2B, the bottom surface 232 of the second cryogenic storage box 202 rest upon the top surface 220 of the first cryogenic storage box 200. Since the protrusions or offsets 230 of the second cryogenic storage box 202 rest within the plurality of lid openings (see, e.g., plurality of lid openings 218 of FIG. 2A) of the first cryogenic storage box 200, stability is provided to the stacked pair of cryogenic boxes 200, 202. Accordingly, light lateral-like forces provided to the first or second cryogenic boxes 200, 202 will not cause them 200, 202 to slide past each other. For example, since the offsets 230 are relatively captured within the openings 218 (FIG. 2A), a light force 248 (FIG. 2B) applied to the second cryogenic storage box 202 will not cause the second cryogenic storage box 202 box to slide off the first cryogenic storage box 200.

In contrast, compare with the plurality of offsets 212 on the first cryogenic storage box 200 resting upon the work surface 246. Since the plurality of offsets 212 of the first cryogenic storage box 200 are resting upon the work surface 246, the bottom surface 214 of the first cryogenic storage box 200 does not rest upon the work surface 246.

It is noted that, though FIG. 2B depicts only two cryogenic storage boxes 200, 202, more than two cryogenic storage boxes (not shown) be stacked in the manner set forth with respect to FIG. 2B.

Figure 3:
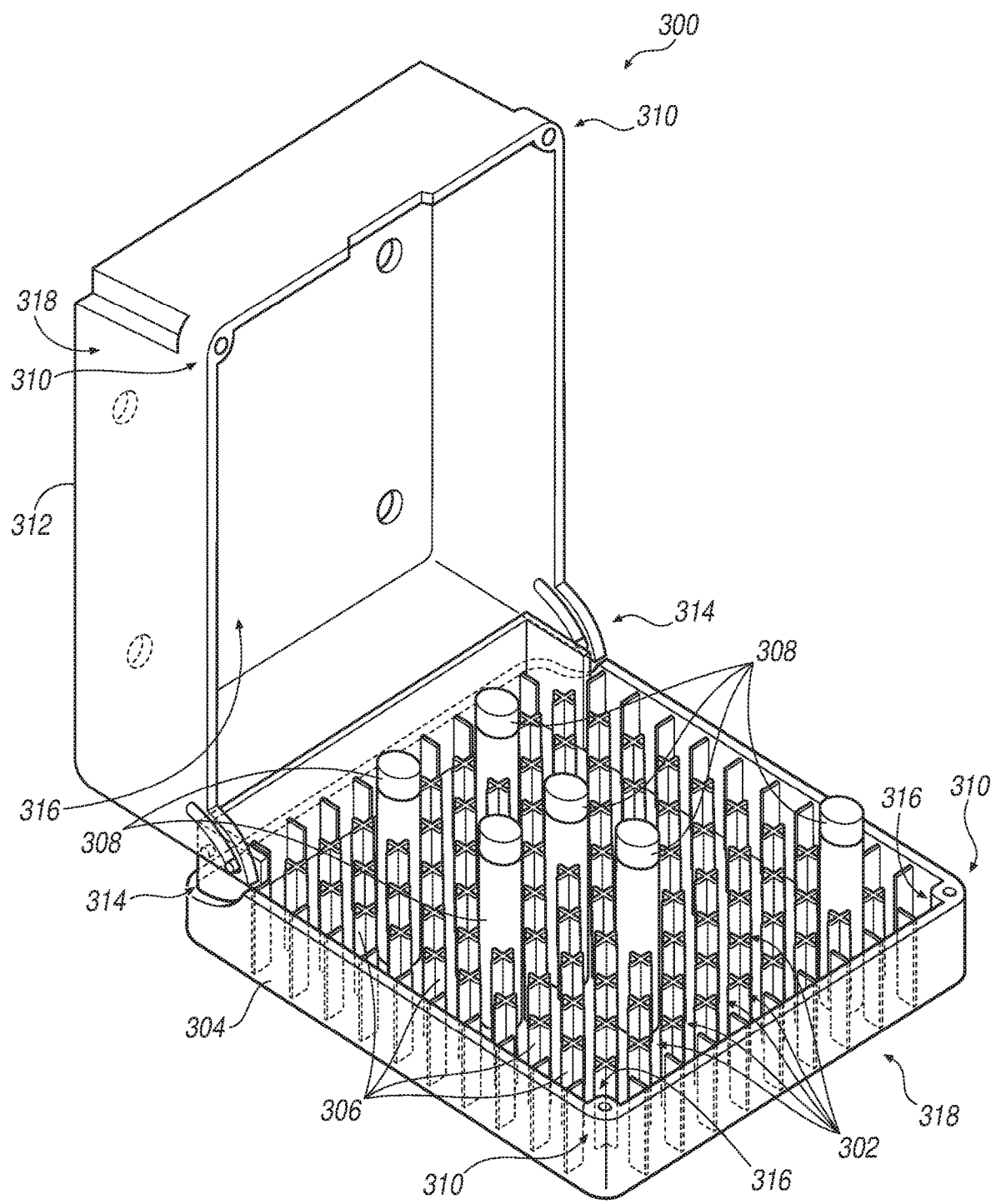
FIG. 3 is a perspective view of another exemplary cryogenic storage box in an open position.

FIG. 3 depicts another illustration of an open cryogenic storage box 300. Similar to the cryogenic storage box 100 of FIGS. 1A-1C, the cryogenic storage box 300 of FIG. 3 includes a plurality of vial supports 302 integrated into a base member 304. The plurality of vial supports 302, however, are comprised of a plurality of posts 306 that support a plurality of vials 308 (shown in phantom), rather than apertures (see, e.g., the plurality of apertures 116 of FIGS. 1A-1C). These posts 306 of FIG. 3 extend upward from the base member 304. It is contemplated that other vial supports (not shown) other than the posts 306 of FIG. 3 and the plurality of apertures 116 of FIGS. 1A-1C may be employed.

The cryogenic storage box 300 of FIG. 3 also includes a magnetic coupling system 310 and a lid member 312 coupled to the base member 304 via a hinge mechanism 314. The magnetic coupling system 310 is positioned on an inner portion 316 of the cryogenic storage box 300 and is located at the corners of the cryogenic storage box 300 (compare with placement in FIGS. 1A-2B).

Since the magnetic coupling system 310 is positioned on an inner portion 316 of the cryogenic storage box 300, when multiple storage boxes (not shown) are placed adjacent to each other in a storage unit, storage space is maximized. That is, since the magnetic coupling system 310 is not placed on an outer portion 318 of the cryogenic storage box 300, surfaces of the adjacent storage boxes (not shown) may be abutted to each other without being obstructed by the magnetic coupling system 310.

As discussed above with reference to FIG. 1B, a base member (e.g., base member 104 of FIGS. 1A-1C) may be comprised of two units (e.g., upper unit 110 and lower unit 108 of FIGS. 1A-1C). FIG. 3, however, illustrates an alternate approach, where the base member 304 is comprised of a single unit or component. Other approaches may employ more than two units (not shown) to create the base member.

Figure 4:
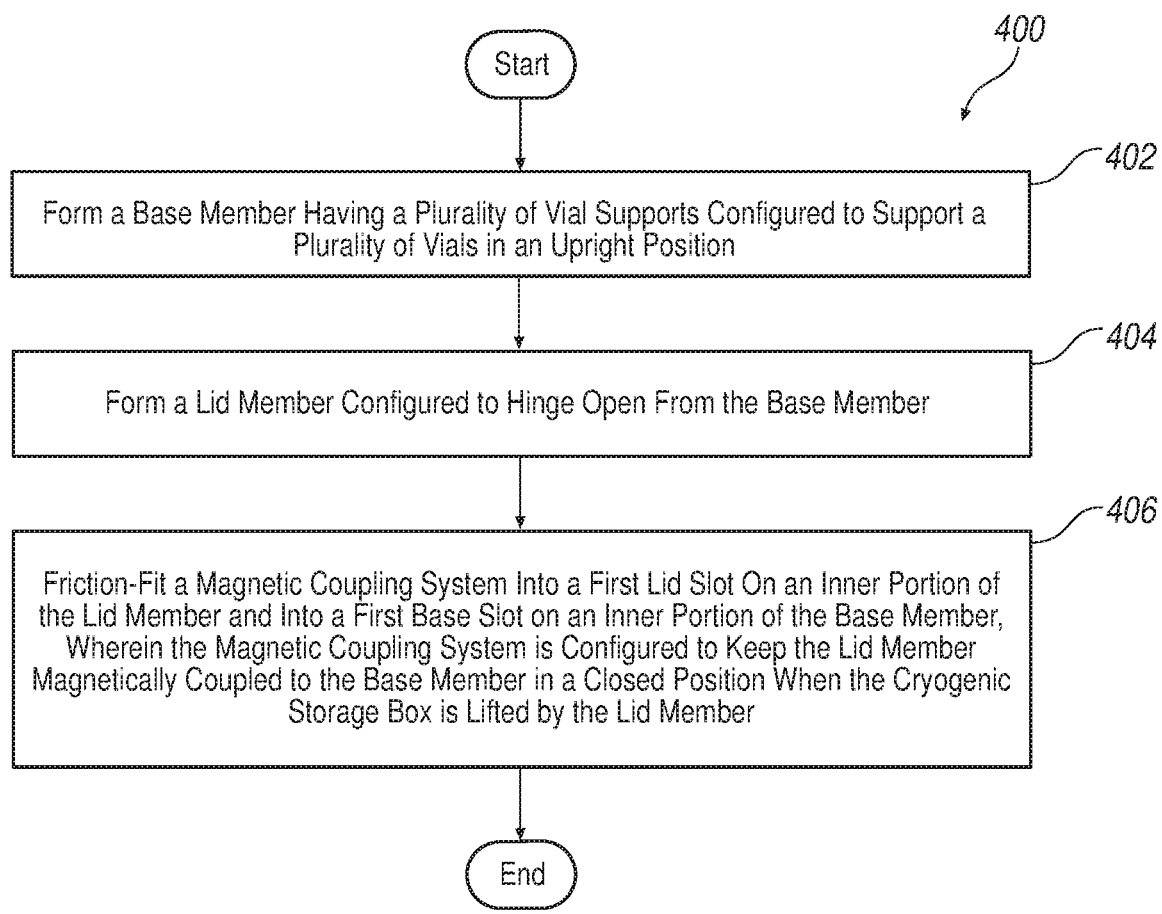
FIG. 4 is a flowchart illustrating an exemplary technique for the manufacture of a cryogenic storage box.

With reference now to FIG. 4, a flowchart illustrates an exemplary technique 400 for manufacturing a cryogenic storage box according to an exemplary approach. Process control begins at 402 where a base member having a plurality of vial supports is formed. The plurality of vial supports is configured to support a plurality of vials (e.g., standard vials, ampoule vials, or the like) in an upright position (see, e.g., FIG. 1A, 316 and FIG. 3, 302). It is contemplated that the base member is comprised of a polycarbonate material substantially stable down to −180 degrees Celsius.

The base member may be comprised of one, two, or more units or components (see, e.g., the one-unit configuration of base member 304 of FIG. 3 and the two-unit configuration of base member 104 of FIG. 1C). The base member may have a plurality a base member holes through a bottom surface of the base member. These base member holes may, for example, be employed for drainage and/or air circulation. The base member may also include a plurality of offsets (see, e.g., offsets 190 of FIG. 1C) extending down from the bottom surface of the base member, where the plurality of offsets are configured to offset the bottom surface of the base member from a work surface when placed thereon. These offsets may also be configured to provide stability to stacked cryogenic boxes. For example, the offsets may be positioned through a plurality of holes (e.g., ventilation holes) of a lid member of a second cryogenic storage box (see. e.g., FIG. 2B) during stacking. As such, when a stacking of two or more cryogenic storage boxes occurs, the offsets of one cryogenic storage box can interlock with the ventilation holes of the cryogenic storage box below it.

Process control then proceeds to block 404, where a lid member configured to hinge open from the base member is formed. The lid member may have a plurality of holes formed through the top surface to aid in ventilation of the cryogenic storage box. As with the base member, it is contemplated that the lid member may be comprised of a polycarbonate material that is substantially stable down to −180 degrees Celsius.

Though not shown, it is noted that the forming of the lid member (block 404) may occur before the forming of the base member (block 402), rather than after as shown in FIG. 4. Alternatively, the lid member and the base member may be formed at the same time.

Referring back to technique 400, after forming the lid member at block 404, process control proceeds to block 406 and a magnetic coupling system is friction-fitted into a first lid slot on an inner portion of the lid member and into a first base slot on an inner portion of the base member. The magnetic coupling system (e.g., magnetic coupling system 120 of FIG. 1A) is configured to keep the lid member magnetically coupled to the base member in a closed position when the cryogenic storage box is lifted by the lid member.

The magnetic coupling system may take a variety of forms. For example, a first lid magnet may be friction-fitted into a lid slot and a first base magnet may be friction-fitted into a first base slot, where the lid slot is on an inner portion of the lid member and the base slot is on an inner portion of the base slot. The base slot is configured to align when the lid slot of an assembled cryogenic box that is in a closed position. As such, when the magnets are positioned such that opposite polarity are adjacent when in the closed position (see, e.g., FIG. 1D), a magnetic couple between the lid member and the base member is created. It is noted that one or more other magnet pairs may be friction-fitted into additional slots in the interior of the lid and base member.

Since each lid slot and base slot are on an inner portion of the cryogenic box, the outer perimeter of the lid member and the base member can be free of obstructions. As such, multiple cryogenic boxes may be packed tightly next to each other.

Instead of employing magnet pairs to create a magnetic coupling, however, the magnetic coupling system may employ a magnet(s) and a ferromagnetic material(s). That is, for example, while a first magnet may be friction-fitted into a first lid member slot, a first ferromagnetic material may be respectively friction-fitted into a first base member slot. As such, the magnet would pair with the ferromagnetic material (instead of another magnet) to create a magnetic coupling. It is noted that the ferromagnetic material may instead be friction-fitted into the first lid member slot, rather than the first base member slot, and the magnet may be friction-fitted into the first base member slot to create the magnetic coupling system. Further, additional magnet/ferromagnetic material pairs may be employed to create additional magnetic couplings on the cryogenic storage box. Increasing the number of pairs creating the magnetic coupling may be particularly desirable when very limited space is available as part of a desire to maximize the number of vials. The overall magnetic force of each magnet or magnetic ferromagnetic material pair is increased in an additive manner even if the force generated by a single pair is inadequate to provide a desired level of closing force.

After friction-fitting the magnetic coupling system to the lid member and the base member, process control proceeds to an END. While manufacturing of each cryogenic box may end after the components (lid member, base member, and magnetic coupling system) are formed or created, it is contemplated that assembly of the three components may also occur during the manufacturing of each cryogenic storage box. For example, if the base member includes a lower and upper unit, manufacturing may include coupling the lower unit to the upper unit, as well as coupling the lid member to the base member via the hinge to create an assembled cryogenic storage box.

With regard to FIGS. 1-4 and the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description or Abstract below, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

As such, exemplary cryogenic storage boxes 100, 200, 202, 300 and items therein (e.g., magnetic coupling system 120 and vial supports 116, 302) may take many different forms and include multiple and/or alternate components. While exemplary systems and components are shown in the Figures, the exemplary systems and components illustrated in the Figures are not intended to be limiting. Indeed, additional or alternative components and/or implementations may be used, and thus the above examples should not be construed as limiting.

It is noted that the cryogenic storage boxes illustrated, as well as alternate implementations not shown, may be comprised of a material stable at both low and high temperatures. For example, a polymer has low rates of thermal expansion and the ability to maintain mechanical properties at both low (e.g., down to at least −180 degrees Celsius) and high temperatures (e.g., up to at least 122 degrees Celsius) may be employed. Accordingly, each cryogenic storage is configured to be mechanically stable (e.g., the hinge mechanism properly operates) throughout a wide range of temperatures (e.g., approximately −180 degrees Celsius to 122 degrees Celsius).

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. An apparatus comprising:
a cryogenic storage box able to withstand temperatures down to at least −180 degrees Celsius and comprising a lid member coupled to a base member via a hinge, wherein the lid member comprises:
a first lid slot and a second lid slot, each of the slots positioned at a location remote from the hinge; and
a first lid magnet and a second lid magnetic respectively held in the first lid slot and the second slot via pressure;
and wherein the base member comprises:
a plurality of vial supports configured to support a plurality of vials in an upright position;
a first base slot and a second base slot; and
a first base magnet and a second base magnet respectively held in the first base slot and the second base slot via pressure;
and wherein, when the lid member is in a closed position, the first lid magnet aligns with the first base magnet along a first vertical axis and the second lid magnet aligns with the second base magnet along a second vertical axis to magnetically couple the lid member to the base member.

2. The apparatus of claim 1, wherein the first and second lid magnets and the first and second base magnets are positioned on an inner portion of the cryogenic storage box.

3. The apparatus of claim 2, wherein the first lid magnet and the second lid magnet are positioned at a first corner of the box and the second lid magnet and the second base magnet are positioned at a second corner of the cryogenic storage box, each of the corners spaced away from the hinge.

4. The apparatus of claim 1, wherein the base member comprises:
an upper unit having the plurality of vial supports, wherein the upper unit includes the first and second base magnets; and
a lower unit coupled to the upper unit.

5. The apparatus of claim 2, wherein the lid member and the base member each have a plurality of vent openings configured to allow the passage of air through the cryogenic storage box when in a closed configuration.

6. The apparatus of claim 5 further comprising a plurality of offsets that protrude from a bottom surface of the base member.

7. The apparatus of claim 6, wherein the plurality of offsets are configured to set into a plurality of vent openings of a second cryogenic storage box when placed on the second cryogenic storage box.

8. A cryogenic storage box configured to store vials in low temperatures, the cryogenic storage box comprises:
a lid member;
a base member coupled to the lid member via a closing mechanism, the base member comprising a plurality of vial supports configured to hold a plurality of vials in an upright position; and
wherein the closing mechanism comprises (i) a magnetic coupling system configured to magnetically couple the lid member to the base member when the cryogenic storage box is in a closed configuration such that the cryogenic storage box can be lifted by the lid member and remain in the closed configuration when the plurality of vial supports are supporting the plurality of vials, and (ii) a hinge to couple a side of the base member to a side of the lid member, wherein the magnetic coupling system is positioned on an inner portion of the cryogenic storage box, the magnetic coupling system comprises:
a first base member slot on an inner region of the base member;
a first lid member slot on the inner region of the lid member;
a first magnet friction-fitted into one of the first base member slot and the first lid member slot and
one of a ferromagnetic material and a second magnet friction-fitted into one of the first base member slot and the first lid member slot not having the first magnet, wherein the first magnet and the one of the ferromagnetic material and the second magnet are free of an adhesive.

9. The cryogenic storage box of claim 8,
wherein the cryogenic storage box configured to store vials in low temperatures is mechanically stable down to negative 180 degrees Celsius and up to 122 degrees Celsius such that the hinge operates.

10. The cryogenic storage box of claim 9, wherein the magnetic coupling system further comprises:
a second base member slot within the inner region of the base member;
a second lid member slot within the inner region of the lid member;
a third magnet friction-fitted into one of the second base member slot and the second lid member slot and
one of an additional ferromagnetic material and a fourth magnet friction-fitted into one of the second base member slot and the second lid member slot not having the third magnet, wherein the third magnet and the one of the additional ferromagnetic material and the fourth magnet are free of an adhesive.

11. The cryogenic storage box of claim 8, wherein the cryogenic storage box further comprises:
a first plurality of apertures through a top surface of the cryogenic storage box;
a second plurality of apertures through a bottom surface of the cryogenic storage box, wherein the first and second plurality of apertures are configured to allow air to flow through the cryogenic storage box; and
a plurality of protrusions that extend downward from the bottom surface of the cryogenic storage box, wherein the plurality of protrusions is configured to offset the bottom surface of the cryogenic storage box from a work surface when the cryogenic storage box is placed on the work surface, and wherein the plurality of protrusions is further configured to pass into a plurality of apertures that are through a top surface of a second cryogenic storage box when the cryogenic storage box is placed on top of the second cryogenic storage box.

12. The cryogenic storage box of claim 8, wherein the plurality of vial supports comprises a plurality of openings through an upper portion of the base member, wherein each opening of the plurality of openings is configured to hold a separate vial from the plurality of vials.

13. The cryogenic storage box of claim 8, wherein the plurality of vial supports comprises a plurality of posts extending upward from the base member.

\* \* \* \* \*